(12) United States Patent
Prince et al.

(10) Patent No.: US 9,140,405 B2
(45) Date of Patent: Sep. 22, 2015

(54) MULTI-AXIS PIVOT SYSTEM AND METHOD

(71) Applicant: Ergotron, Inc., Saint Paul, MN (US)

(72) Inventors: David J. Prince, St. Paul, MN (US); Jeffrey Mensing, Plymouth, MN (US); Joe Funk, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 101 days.

(21) Appl. No.: 13/861,566

(22) Filed: Apr. 12, 2013

(65) Prior Publication Data

US 2013/0270404 A1 Oct. 17, 2013

Related U.S. Application Data

(60) Provisional application No. 61/623,661, filed on Apr. 13, 2012, provisional application No. 61/701,122, filed on Sep. 14, 2012.

(51) Int. Cl.
*E04G 3/20* (2006.01)
*F16M 13/02* (2006.01)
(Continued)

(52) U.S. Cl.
CPC ............ *F16M 13/022* (2013.01); *F16M 11/041* (2013.01); *F16M 11/14* (2013.01); *F16M 11/2085* (2013.01); *F16M 13/00* (2013.01); *F16M 13/02* (2013.01)

(58) Field of Classification Search
CPC ....... F16M 11/04; F16M 11/00; F16M 11/22; F16M 13/022; F16M 11/14; F16M 11/041; F16M 11/2085; F16M 13/00; F16M 13/02
See application file for complete search history.

(56) References Cited

U.S. PATENT DOCUMENTS

| 718,445 | A | * | 1/1903 | Fliehmann | ................. 248/181.1 |
| 1,894,456 | A | * | 1/1933 | Zerk | ......................... 248/181.1 |

(Continued)

FOREIGN PATENT DOCUMENTS

| CN | 104364574 A | 2/2015 |
| DE | 202008013152 | 1/2009 |

(Continued)

OTHER PUBLICATIONS

"International Application U.S. Appl. No. PCT/US2013/036363, International Preliminary Report on Patentability mailed Oct. 23, 2014", 9 pgs.

(Continued)

*Primary Examiner* — Amy Sterling
(74) *Attorney, Agent, or Firm* — Schwegman Lundberg & Woessner, P.A.

(57) ABSTRACT

Some embodiments provide a pivot mechanism and/or system that includes a support member defining a cavity and an extension member at least partially located within the cavity. In some cases one or more inner surfaces of the cavity can provide one or more pivots defining multiple pivot axes about which the extension member is generally pivotable through corresponding pivot ranges. The extent of the pivot ranges can be defined by the cavity within the support member. In some cases cooperating clamp members engage the extension member and the support member to retain the extension member within the cavity. The clamp members may also include sliding surfaces that slidingly engage with the support member to provide frictional resistance to pivoting movement of the extension member. Electronic display pivoting and positioning systems are also provided as are methods for positioning and pivoting electronic displays.

19 Claims, 11 Drawing Sheets

(51) Int. Cl.
*F16M 11/14* (2006.01)
*F16M 11/04* (2006.01)
*F16M 11/20* (2006.01)
*F16M 13/00* (2006.01)

(56) References Cited

U.S. PATENT DOCUMENTS

| | | |
|---|---|---|
| 4,066,231 A | 1/1978 | Bahner |
| 4,666,118 A | 5/1987 | Busche |
| 6,012,693 A | 1/2000 | Voeller |
| 6,354,549 B2 | 3/2002 | Sweere |
| 6,419,196 B1 | 7/2002 | Sweere |
| 7,320,555 B2 * | 1/2008 | Chang et al. ............ 403/122 |
| 7,690,611 B2 | 4/2010 | Asamarai |
| 8,162,268 B1 | 4/2012 | Huang |
| 2005/0151040 A1 * | 7/2005 | Hsu .............. 248/214 |
| 2006/0145043 A1 | 7/2006 | Liou |
| 2009/0095869 A1 | 4/2009 | Hazzard |

FOREIGN PATENT DOCUMENTS

| | | |
|---|---|---|
| GB | 2225606 | 6/1990 |
| WO | WO-2013/155410 A1 | 10/2013 |

OTHER PUBLICATIONS

International Search Report and Written Opinion, dated Jul. 18, 2013 for PCT Application No. PCT/US2013/036363, 12 pages.

* cited by examiner

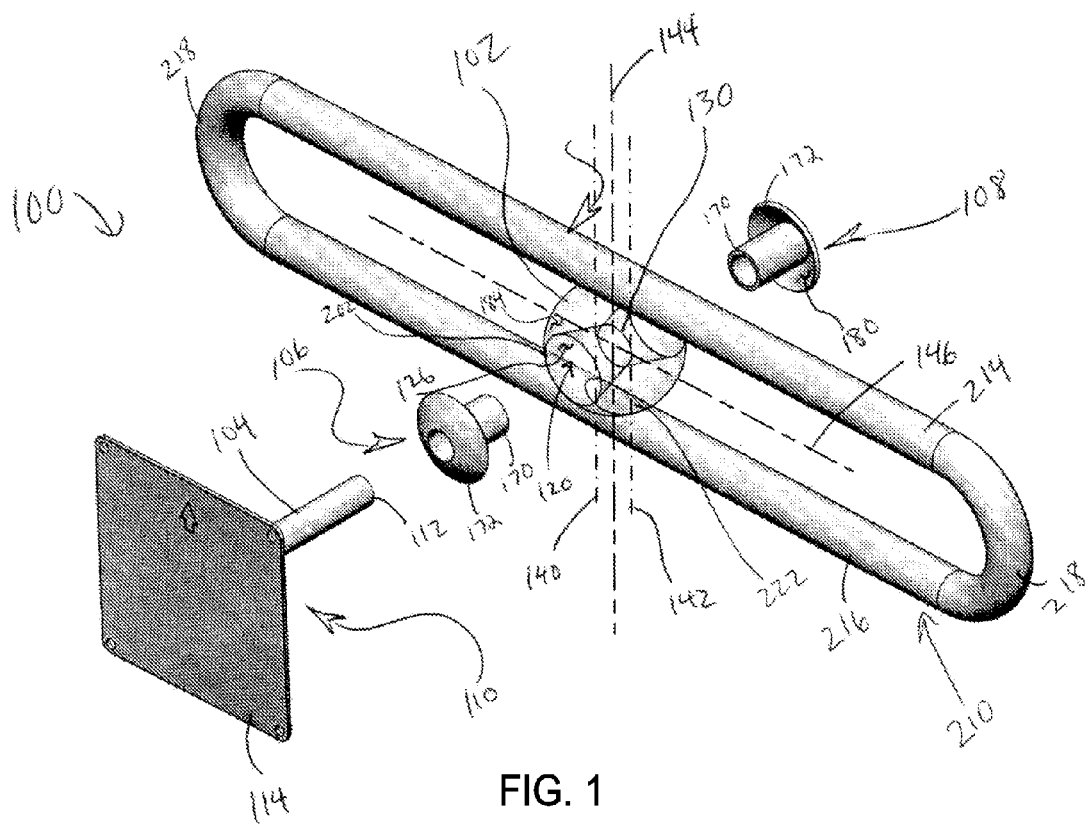
FIG. 1
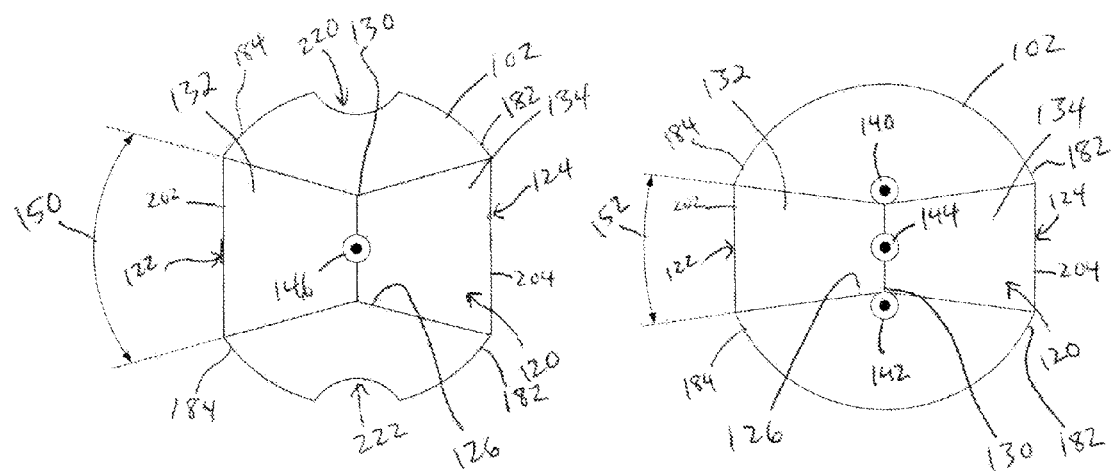
FIG. 2A
FIG. 2B

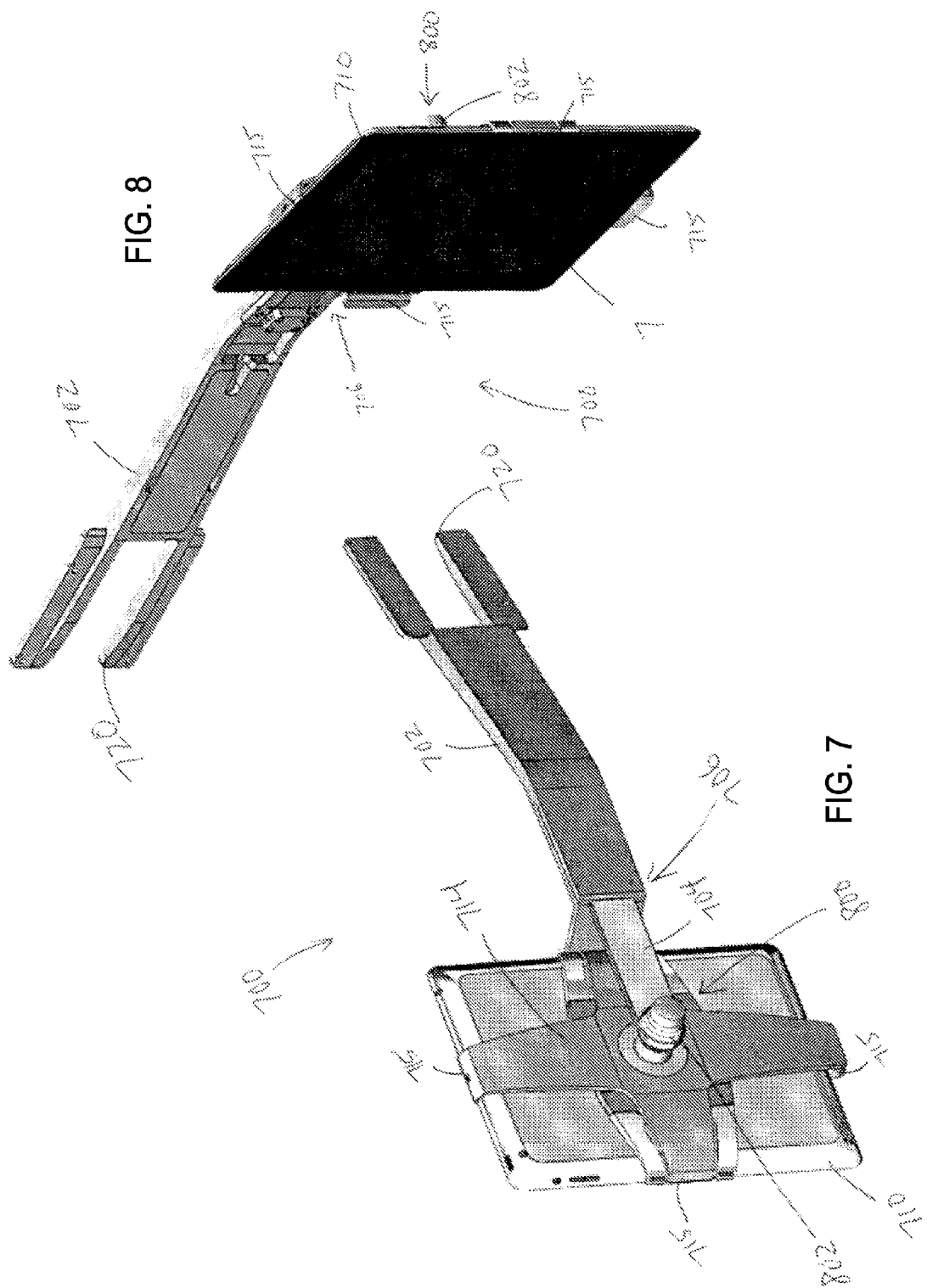

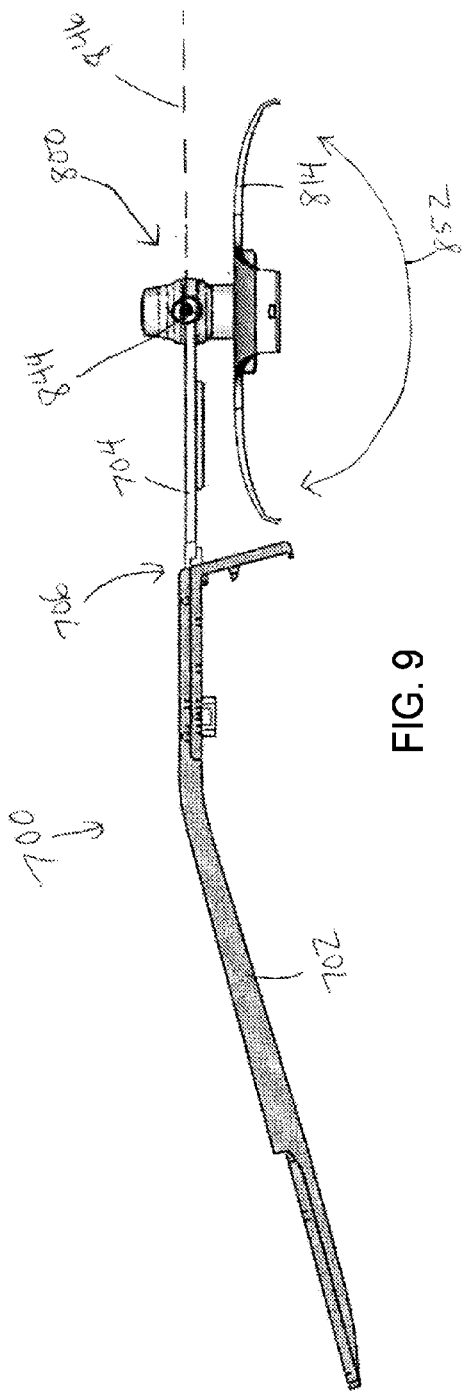
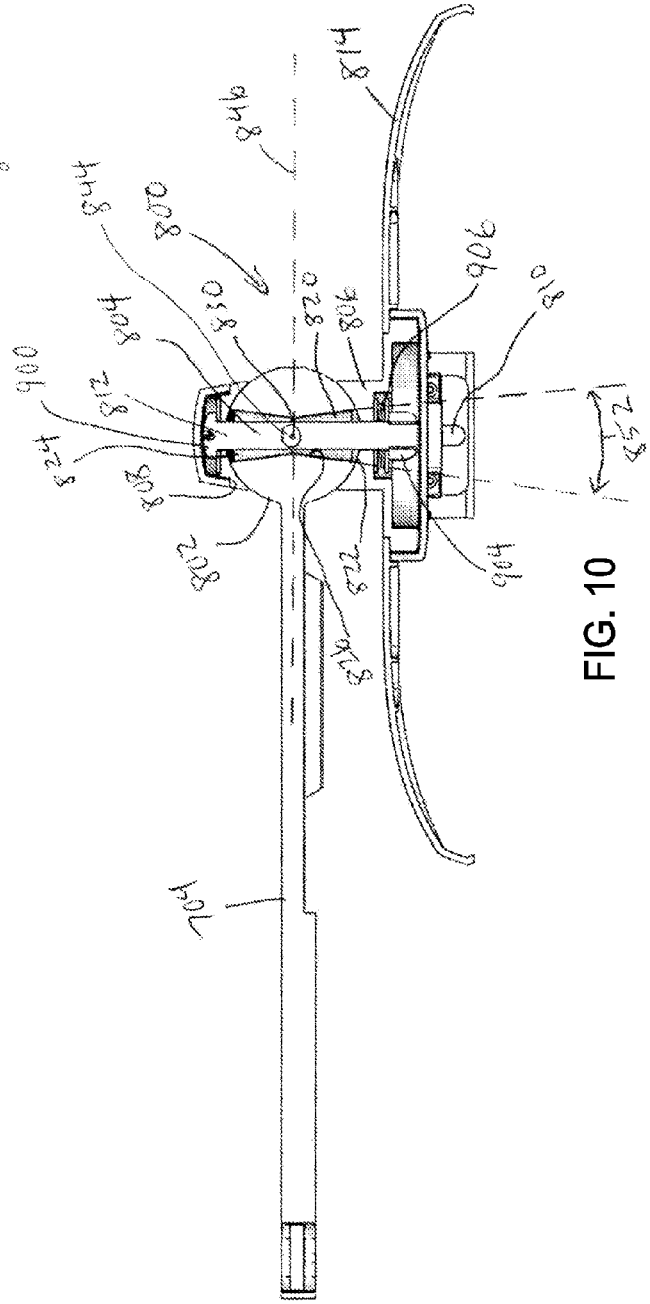
FIG. 9
FIG. 10

MULTI-AXIS PIVOT SYSTEM AND METHOD

CROSS-REFERENCES

This application claims the benefit of U.S. Provisional Application No. 61/623,661, filed Apr. 13, 2012, and U.S. Provisional Application No. 61/701,122, filed Sep. 14, 2012, the contents each of which are hereby incorporated by reference in their respective entireties.

FIELD

This disclosure generally relates to systems and methods for pivoting objects about multiple axes and in some cases relates to systems and methods for pivoting electronic displays.

BACKGROUND

Pivot mechanisms are a common component of devices and systems that provide adjustable positioning of various objects within a three-dimensional space. Incorporating a pivot mechanism within a positioning apparatus can be useful, for example, to provide an additional degree of freedom or range of motion. As just one example, articulating arms that position electronic displays relative to, e.g., a work surface, often include a pivot mechanism that allows a user to pivot the electronic display about a corresponding axis. In some cases "pivoting" may refer to any rotation about a pivot or corresponding pivot axis, and/or may include other terms such as rotating, tilting, and/or panning depending on the context. For example, pivoting is often used to tilt a display (or any other object) up and down about a horizontal axis. Such pivoting is also used to rotate or pan a display left and right or side to side about a vertical axis. In cases where both tilt and pan are desired, or where other multiple types of pivoting are desired, two or more pivot mechanisms can be coupled together to provide additional degrees of freedom about additional axes.

In general, a pivot range can be considered as extending through an angle and thus measured in terms of degrees. Thus a pivot mechanism can provide an angular range of motion, i.e., a pivot range, about a pivot axis that is measured in degrees. In some cases pivot mechanisms may also include some type of mechanism to maintain the desired pivot angle against the weight of a supported object. Some pivot mechanisms provide a force that offsets some or all of the torque created by the weight of the object supported about the pivot axis. Such a force can allow a user to more easily move an object through the available pivot range.

SUMMARY

Embodiments of the invention can provide systems and methods with multiple pivot axes, about which an object (e.g., an electronic display) can be pivoted. In some embodiments a pivoting support system includes a support member, an extension member, a first clamp member, a second clamp member, and a mounting member. The support member defines a first opening, a second opening, and a cavity that extends through the support member between the first opening and the second opening. The support member also includes an inner surface that is located within the cavity. The inner surface provides a pivot that defines a first pivot axis extending through the support member. The cavity defines a first pivot range about the first pivot axis.

The extension member has first and second ends, and is located at least partially within the cavity of the support member near the pivot. In this way the extension member is generally pivotable about the first pivot axis through the first pivot range defined by the cavity. The first end of the extension member can protrude from the first opening in the support member. The first clamp member and the second clamp member engage the extension member and the support member and thus retain the extension member at least partially within the cavity of the support member. The mounting member is coupled proximate the first end of the extension member and can support an object (e.g., such as an electronic display) as the extension member pivots through the first pivot range relative to the support member.

Some embodiments provide a display positioning system that provides multiple pivot axes. In some cases a display positioning system includes a support structure that is configured to rest upon a support surface such as, for example, a table and/or be fixed to a support surface such as, for example, a wall. The display positioning system includes a sliding apparatus coupled to the support structure and a support member coupled to the sliding apparatus. The support member defines a cavity and has an inner surface located within the cavity. The sliding apparatus provides the support member with a range of translation. The cavity extends through the support member between a first opening in the support member and a second opening in the support member, while the inner surface provides a pivot that defines multiple pivot axes extending through the support member. The cavity defines a corresponding pivot range about each of the multiple pivot axes.

The display positioning system further includes an extension member having a first end, a second end, and a length extending between the first and the second ends. The extension member is located near the pivot so that the extension member is generally pivotable about each of the multiple pivot axes through the corresponding pivot range defined by the cavity. The display positioning system also includes a first clamp member and a second clamp member that engage the extension member and the support member to retain the extension member at least partially within the support member cavity. The display positioning system also includes a mounting member coupled proximate the first end of the extension member. The mounting member is configured to support an electronic display during pivoting of the extension member relative to the support member.

According to some embodiments, one or more methods for pivoting an electronic display or other object are provided. In some cases a method for pivoting an electronic display includes mounting an electronic display to a pivoting support system and tilting and panning the electronic display relative to the pivoting support system.

In some cases tilting the electronic display includes tilting a mounting member and an extension member through a tilt range. The extension member is located at least partially within a cavity of a support member of the pivoting support system. The cavity defines the tilt range about a generally horizontal axis extending through the support member corresponding to a pivot provided by an inner surface of the cavity. Tilting the electronic display can also include sliding first and second surfaces of first and second clamp members, respectively, across corresponding first and second outer surfaces of the support member. Sliding the respective surfaces overcomes frictional resistance to tilting that is provided by the first and the second clamp members and the support member.

In some cases panning the electronic display includes rotating the mounting member and the extension member through a pan range defined by the support member cavity. The pan rage is refined about a generally vertical axis extending through the support member that corresponds to the pivot provided by the inner surface of the cavity. Panning the electronic display can also include sliding the first and the second surfaces of the first and the second clamp members, respectively, across the corresponding first and second outer surfaces of the support member. Sliding the respective surfaces overcomes frictional resistance to panning provided by the first and the second clamp members and the support member.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIG. 1 is perspective exploded assembly view of a pivoting support system according to an embodiment.

FIG. 2A is a first cross-section of a support member of the pivoting support system of FIG. 1 according to an embodiment.

FIG. 2B is a second cross-section of the support member of the pivoting support system of FIG. 1 according to an embodiment.

FIG. 7 is a first perspective view of a display pivoting system according to an embodiment.

FIG. 8 is a second perspective view of the display pivoting system of FIG. 7 according to an embodiment.

FIG. 9 is a top plan view of the display pivoting system of FIG. 7 according to an embodiment.

FIG. 10 is a first cross-section of a portion of the display pivoting system of FIG. 7 according to an embodiment.

DETAILED DESCRIPTION

Figure 3:
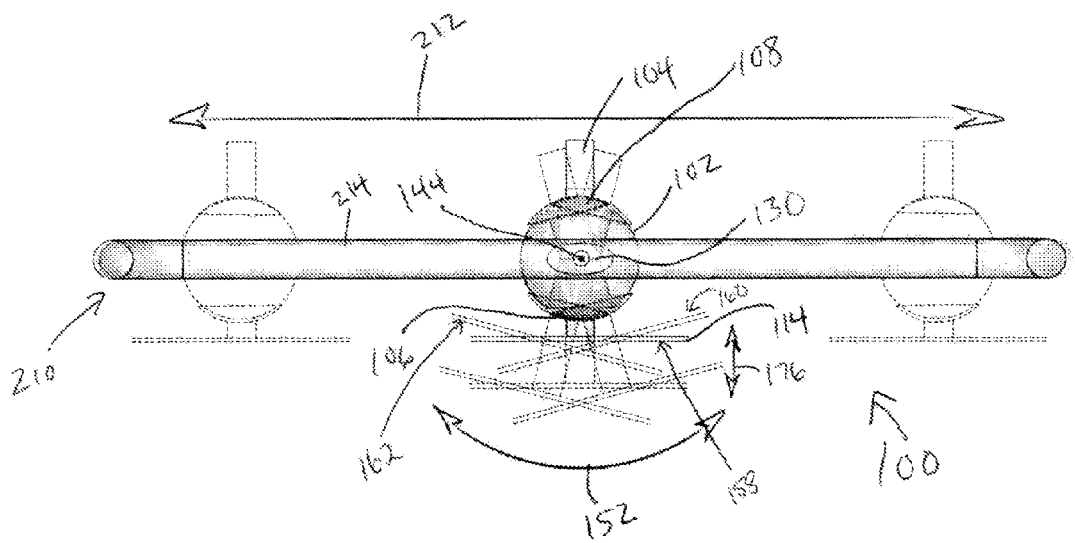
FIG. 3 is a top plan view of the assembled pivoting support system of FIG. 1 according to an embodiment with alternate configurations illustrated.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Some embodiments of the invention provide a system and/or a device with multiple pivot axes that allows for pivoting an object supported by the system and/or device through one or more pivot ranges. Some embodiments provide a method for positioning and/or pivoting an object using such systems and/or devices. It is contemplated that various embodiments may support the positioning and/or pivoting of a variety of types of objects. As just one example, the following disclosure describes a number of embodiments that enable pivoting of an electronic display about multiple pivot axes and/or through multiple pivot ranges. For example, some embodiments can provide a pivot mechanism and/or a pivoting support system that can be coupled to an electronic display to provide the display with pivoting functionality described herein. Some embodiments provide a method of pivoting an electronic display as will be described. Some embodiments can provide an apparatus, device, and/or system capable of positioning various objects, including an electronic display, relative to a human operator. The apparatus/device/system (e.g., a display positioning system) can incorporate a pivot mechanism and/or pivoting support system to provide the electronic display with the pivoting functionality described herein.

As used herein, the term electronic display is used to refer to televisions, computer monitors, tablet computers, smart phones, and other types of displays that are capable of displaying images from electronic signals and that are made using one of a variety of known display technologies (e.g., plasma, LCD, LED, OLED, etc.). In addition, while numerous examples of embodiments configured for pivoting an electronic display are described herein, it should still be appreciated that the invention is not limited to supporting an electronic display and some embodiments can be configured to support and pivot other objects.

FIGS. 1-6 provide various views of a pivoting support system 100 according to some embodiments of the invention. Beginning with FIG. 1, a perspective exploded assembly view of the pivoting support system 100 is shown. In this example, the pivoting support system 100 generally includes a support member 102, an extension member 104, and two clamp members 106, 108 that cooperate to pivot an object supported by the system 100 about one or more pivot axes. In this example the extension member 104 is formed as a longitudinal rod or shaft that has a first end 110 and a second end 112. A mounting member 114 is coupled to the extension member 104 proximate its first end 110 (attachment not shown in FIG. 1). The mounting member 114 is configured to support an object as the extension member 104 pivots relative to the support member 102 as will be described.

The mounting member 114 can be configured to support an object in any suitable manner (e.g., fixedly, removably, movably, etc.) depending upon the type of object being supported. As illustrated in FIG. 1, in this example the mounting member 114 is an electronic display mount in the form of a VESA interface that can be attached to the rear surface of an electronic display. Although not visible in FIG. 1, the electronic display mount is attached to the first end 110 of the extension member 104 in this embodiment.

Figure 4:
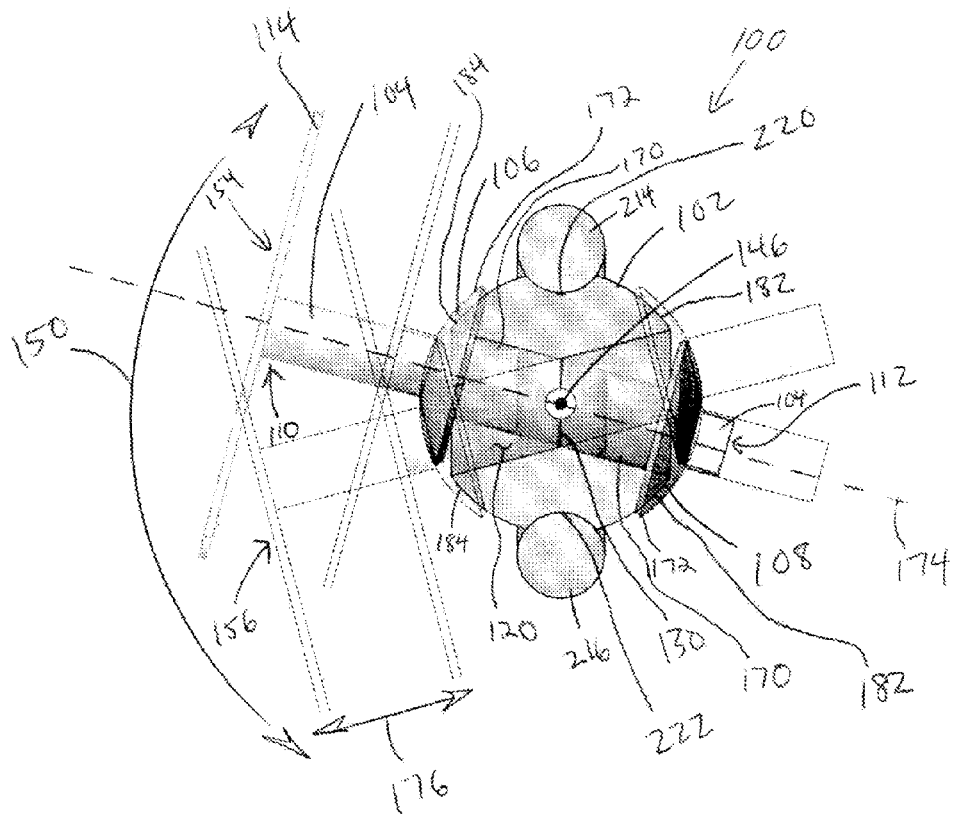
FIG. 4 is a side cross-sectional view of the assembled pivoting support system of FIG. 1 according to an embodiment with alternate configurations illustrated.

The extension member 104 is received within the support member 102, which in this case provides multiple pivot ranges for pivoting the extension member and attached mounting member. FIGS. 2A and 2B illustrate cross-sections of the support member 102 according to some embodiments. FIG. 3 is a top plan view of the assembled pivoting support system 100 and FIG. 4 is a side cross-sectional view of the assembled pivoting support system 100, each illustrating multiple pivot ranges that will be described further herein.

As shown in FIGS. 1-4, the support member 102 in this example has a spherical shape, having the appearance of a truncated ball, though the support member 102 can be formed in any suitable shape. As will be described further herein, in some cases the shape of the support member 102, and in particular the shape of one or more portions of an exterior surface of the support member, can be designed to engage the clamp members 106, 108 in a friction fit. Returning to FIGS. 1-4, the support member 102 defines a cavity 120 within the support member. The cavity 120 extends through the support member 102 between a first opening 122 in the support member and a second opening 124 in the support member. The support member 102 includes an inner surface 126 located within the cavity 120. In this case the inner surface 126 defines part of the boundary of the cavity 120, though this is not strictly required.

As best shown in FIGS. 1-2B, the inner surface 126 provides a pivot 130. In this example the inner surface 126 provides the pivot 130 in the form of an annular (e.g., circular, elliptical, etc.) ridge extending along the inner surface of the support member. As shown in FIGS. 1-2B, the pivot 130 is located at a transition between a first frustoconical portion 132 of the cavity and a second frustoconical portion 134 of the cavity. The ridge-shaped pivot 130 in this example defines multiple pivot axes extending through the support member 102. As shown in FIGS. 3-6, the extension member 104 is located at least partially within the cavity 120 near the pivot 130. The proximity to the pivot 130 allows the extension member 104 to pivot about each of the multiple pivot axes defined by the pivot 130.

The definition or characterization of the multiple pivot axes can vary depending upon a chosen point of reference. For example, as shown in FIGS. 1 and 2B, in some cases two pivot axes 140, 142 can be defined as being generally coplanar with the ridge pivot 130 and generally tangent to the annular ridge 130. (Circled dot symbols are used to indicate the location of an axis extending out from the drawing sheet.) In this case the extension member 104 pivoting about one of the pivot axes 140, 142 should be understood as referring to the extension member 104 pivoting with respect to the side of the extension member. In other embodiments, as shown in FIGS. 1, 2A, and 2B, two pivot axes 144, 146 can be defined as being generally coplanar with the annular ridge pivot 130 and generally intersecting the annular ridge pivot 130 at various angles. In this case the extension member 104 pivoting about one of the pivot axes should be understood as referring to the extension member 104 pivoting about a center of the width of the extension member. Of course other characterizations of the pivot axes and pivoting motion can be employed to suit the depicted and/or other embodiments.

In some embodiments a support member pivot may provide at least two pivot axes that are perpendicular. Referring to FIGS. 1-4 for example, in this case the ridge pivot 130 defines the vertically-oriented pivot axis 144 and the horizontally-oriented pivot axis 146 (e.g., vertical or horizontal with respect to the views of the figures). According to some embodiments, pivoting of the extension member 104 about the vertically-oriented pivot axis 144 may also be referred to as panning, and the pivot axis 144 may be referred to as a pan axis. In some cases pivoting of the extension member 104 about the horizontally-oriented pivot axis 146 may also be referred to as tilting, and the pivot axis 146 may be referred to as a tilt axis.

Referring to FIGS. 1-4, the cavity 120 defines a pivoting range for each of the multiple pivot axes in that the boundary of the cavity 120 provides an outer limit on the range of pivoting available to the extension member 104 about any given pivot axis. As shown in FIGS. 2A and 4, the cavity 120 defines a first pivot range 150 corresponding to the horizontally-oriented pivot axis 146. Thus, the extension member 104, the mounting member 114, and an electronic display (or other object) attached to the mounting member 114 can be tilted up and down about the pivot axis 146 through the first pivot range 150. FIG. 4 depicts the extension member 104 and mounting member 114 in multiple pivot configurations about the pivot axis 146, including a first configuration 154 shown in solid lines and a second configuration 156 illustrated in dashed lines.

As shown in FIGS. 2B and 3, the cavity 120 defines a second pivot range 152 about the vertically-oriented pivot axis 144. Accordingly, the extension member 104, the mounting member 114, and a supported object can be panned side to side about the pivot axis 144 through the second pivot range 152. FIG. 3 depicts the extension member 104 and mounting member 114 in multiple pivot configurations about the pivot axis 144, including a first configuration 158 shown in solid lines, and second and third configurations 160, 162 illustrated in dashed lines.

The extent of the pivot ranges provided by different embodiments can be varied by providing the support member cavity 120 with different shapes and sizes. In some cases a pivot range may extend up to about ±10 degrees about the pivot axis, up to about ±45 degrees about the pivot axis, or up to about ±60 degrees or more about the pivot axis depending upon the desired amount of pivoting. Given that in some cases the extent of a pivot range is defined by the size of the cavity 120 and a corresponding absence of material within the support member 102, in some cases a maximum extent of a pivot range may be determined in part by a minimum amount of structural support needed from the support member 102.

In addition, the size and the shape of the cavity 120, as well as the size and shape of the pivot 130 provided by the inner surface 126 of the support member can also be a factor in determining how many pivot axes are provided by a particular embodiment. For example, as shown in FIGS. 1-6, the cavity 120 includes a first frustoconical portion 132 and a second frustoconical portion 134, and the transition between the frustoconical portions 132, 134 forms the ridge pivot 130 that extends about the inner surface of cavity 120. The frustoconical portions of the cavity have a varying conical cross-section, which in some cases may, but need not be, circular. The pivot 130 (i.e., in this case a ridge-shaped pivot or ring-shaped pivot) may have a circular shape, an elliptical shape, or another shape that corresponds to the cross-sections of the adjacent portions of the cavity 120. Thus, referring to the pivot axes 144 and 146 in the figures, it can be appreciated that in some cases pivot axes 144 and 146 can be defined as intersecting a symmetrical cavity (e.g., a right circular cone) such that corresponding pivot ranges 152, 150 have the same size, thus providing the same amount of tilting and panning for the embodiment.

Alternatively, in some cases the pivot axes 144, 146 can be defined as intersecting a cavity non-symmetrically, such that the size of one of the pivot ranges 152, 150 is different than the other. For example, in some cases the height of the cavity 120 may be greater than the width of the cavity, corresponding to an elliptically-shaped pivot that provides a greater amount of tilt about the horizontal axis 146 and a smaller amount of pan about the vertical axis 144. As just one possible example, a tilt range 150 can be provided in this manner with a size of about ±10 degrees about the pivot axis 146 and a pan range 152 can be provided with a size of about ±7 degrees about the pivot axis 144.

It should be appreciated that the shape of the cavity 120 and the pivot 130 can be greatly varied, and thus a virtually infinite number of pivot axis and pivot range combinations can be provided according to some embodiments of the invention. For example, as shown in FIGS. 1-6, the use of a cavity having a circular or elliptical cross-section and ring pivot 130 can define an infinite number of pivot axes extending through the support member, with the cavity defining a corresponding pivot range about each of the pivot axes. Conversely, a cavity having a narrow slot cross-section and pivot may simply provide a single pivot axis collinear with a slot-shaped pivot such that the extension member can only pivot in one dimension (e.g., the extension member may only tilt, may only pan, etc.). Of course a number of cavity and pivot shapes other than a circle, ellipse, or slot may also be provided, including non-symmetrical configurations depending upon the desired pivoting functionality.

As described above in reference to FIG. 1, in this example, the pivoting support system 100 includes a first clamp member 106 and a second clamp member 108 that cooperate with the support member 102 and the extension member 104 to provide some of the pivoting functionality disclosed herein. Referring now to FIG. 4, the side cross-section of pivoting support system 100 illustrates the engagement provided in this embodiment between the clamp members, the support member, and the extension member. In particular, the first clamp member 106 engages the extension member somewhat near its first end 110 and also engages the support member 102 about the first opening 122. The second clamp member 108 engages the extension member somewhat near its second end 112 and also engages the support member 102 about the second opening 124. Thus the engagement between the first and second clamp members 106, 108 and the support member 102 acts to retain the extension member 104 at least partially within the cavity 120 of the support member 102.

The clamp members 106, 108 can be provided in any suitable configuration for engaging the extension member 104 and the support member 102 depending upon the shape, size, configuration, etc., of the support member and extension member. As shown in FIG. 1, in some embodiments each clamp member generally includes a tubular member 170 connected to a cap member 172 having a through hole in communication with the aperture of the tubular member 170. In this case the tubular member 170 is sized and shaped to fit within the cavity 120, while the cap member 172 is sized and shaped to engage an exterior surface of the support member 102. When positioned within the cavity 120, the tubular members 170 of the clamp members 106, 108 can be connected (e.g., integrally, fastened, etc.) to lock the clamp members in place within the cavity and in engagement with the exterior surface of the support member. Although not shown in the figures, the tubular members 170 of the clamp members 106, 108 can in some cases incorporate cooperating thread members that allow one tubular member to be screwed into the other tubular member.

As shown in FIG. 4, the extension member 104 can be received through the tubular members 170 and through holes of each clamp member 106, 108 to locate the extension member at least partially within the clamp members and thus also partially within the support member cavity 120. According to some embodiments, a frictional fit is provided between the extension member 104 and the clamp members such that the extension member can be moved axially within the tubular members by exerting an axial force that overcomes the resistance force provided by the frictional fit. As shown in FIG. 4, in some embodiments the clamp members thus allow adjustment of an axial location of the extension member 104 relative to the support member 102 along an axis 174 extending along the length of the extension member. FIG. 4, as well as FIG. 3, illustrates alternate configurations in dashed lines in which the extension member 104 is positioned at different axial locations along the axis 174. The frictional fit between the clamp members 106, 108 and the extension member 104 thus provides an extension or depth range 176 of axial movement for the extension member.

According to some embodiments, the first and second clamp members 106, 108 engage the support member 102 at least in part by having a surface in sliding engagement with a surface of the support member. For example, as shown in FIG. 1, an interior surface of the cap member 172 of the second clamp member 108 can provide a sliding surface 180 configured to slidingly engage an outer surface 182 of the support member proximate the second opening 124 in the support member (e.g., near and/or surrounding the second opening). The two opposing surfaces 180, 182 are in sliding engagement as the extension member 104 pivots through one or more pivot ranges (e.g., through the tilt range 150 and/or the pan range 152).

According to some embodiments, the sliding engagement between the two surfaces provides a frictional resistance to relative movement of the surfaces 180, 182, and thus also to movement of the extension member 104 relative to the support member 102. Such frictional resistance can be useful for arresting and/or reducing unintended or unwanted movement of the extension member caused by, for example, the weight of an attached object such as an electronic display. Although not shown in FIG. 1, clamp member 106 includes a corresponding sliding surface that slidingly engages another outer surface 184 of the support member proximate the first opening 122 in the support member. The frictional resistance generated by the sliding engagement of the clamp member 106 with the outer surface 184 adds to the frictional resistance generated by the clamp member 108, thus providing the ability to resist movement of the extension member when supporting heavier objects (e.g., larger electronic displays).

According to some embodiments, the amount or degree of frictional resistance provided by the pivoting support system 100 can depend on one or more factors. For example, in some cases the degree of resistance can be varied by choosing particular materials having various coefficients of friction. In some cases the support member is formed of metal, such as cast or machined aluminum, zinc, steel, or another suitable metal or metal alloy. In such cases, the outer surfaces 182, 184 of the support member may be optionally polished to provide a smoother sliding engagement with the clamp members. According to some embodiments, the clamp members and/or the sliding surfaces of the clamp members are formed from a molded plastic or nylon. In some cases the support member may also be formed from plastic, nylon, or another material. Of course the invention is not limited to any particular materials combination and it should be appreciated that various components can be formed from any material known to be suitable for the desired implementation.

According to some embodiments, the degree of resistance can also be varied (e.g., increased, decreased) by adjusting the connection between the first and second clamp members 106, 108. For example, in some cases a threaded connection between the clamp member tubular members 170 can be tightened to provide a greater compressive force and/or loosened to provide a lesser compressive force between the clamp members and the support member. Accordingly, the frictional resistance can be increased and/or decreased, respectively.

In some embodiments the frictional resistance provided by the pivoting support system 100 can also or instead be determined based on the size and shape of the sliding surfaces on the clamp members and the corresponding outer surfaces of the support member. For example, in some cases the cap member 172 of the clamp member 108 may be configured such that its sliding surface 180 has a curved surface that very closely or substantially matches the contours of the outer surface 182 on the support member. Providing a close fit between the two surfaces can promote a smooth sliding engagement and greater surface contact and thus resistance between the two surfaces. As shown in the figures, the spherical shape of the support member 102 truncated by the first and second openings 122, 124 can help provide a smooth curved surface for the curved cap members 172 to slide against.

Of course embodiments of the invention are not limited to the shapes and configurations depicted in the figures or described herein, and it should be appreciated that other shapes and configurations of the support member and clamping members may be used in other embodiments. In particular, a number of variations are possible for implementing the clamp members, the support member, and the extension member in some embodiments and not all embodiments may incorporate configurations as illustrated with the example of the pivoting support system 100 in FIGS. 1-6. As just one example, FIGS. 7-12B depict an alternate embodiment in which clamp members do not include tubular members extending into the cavity of a support member as will be described hereinafter. As will be appreciated, in embodiments in which clamp members extend into the support member cavity (e.g., as with the pivoting support system 100 in FIGS. 1-6) the additional width of the clamp members 106, 108 provided by the portion extending into the cavity can increase the effective width of the extension member 104. The increased width of the extension member and clamp member combination can also decrease available pivot range since the increased width occupies more space within the cavity in any one position.

Figure 5:
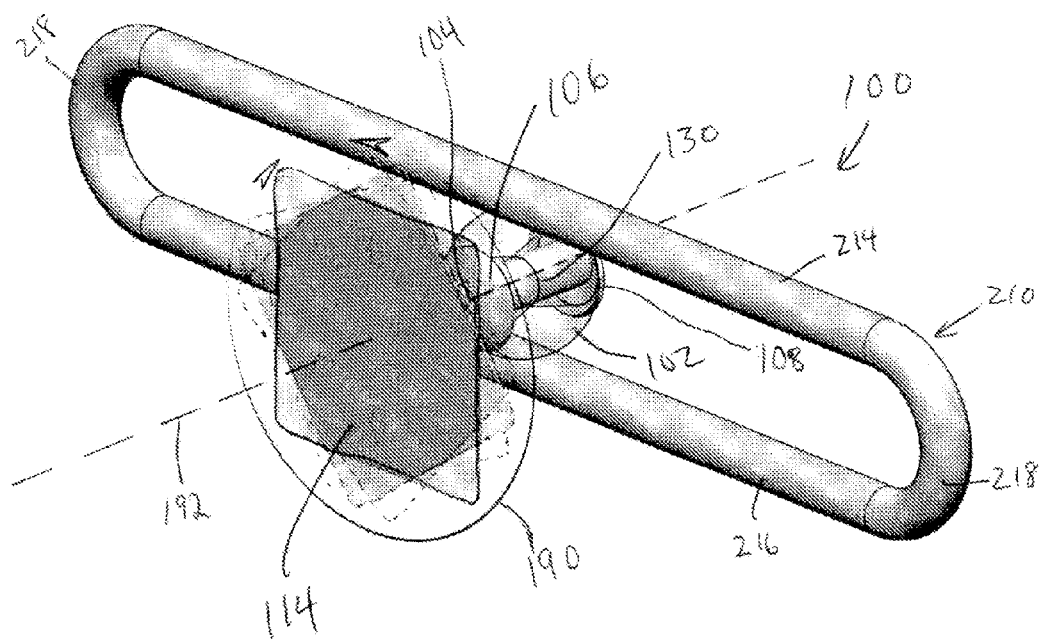
FIG. 5 is a perspective view of the assembled pivoting support system of FIG. 1 according to an embodiment.
Figure 6:
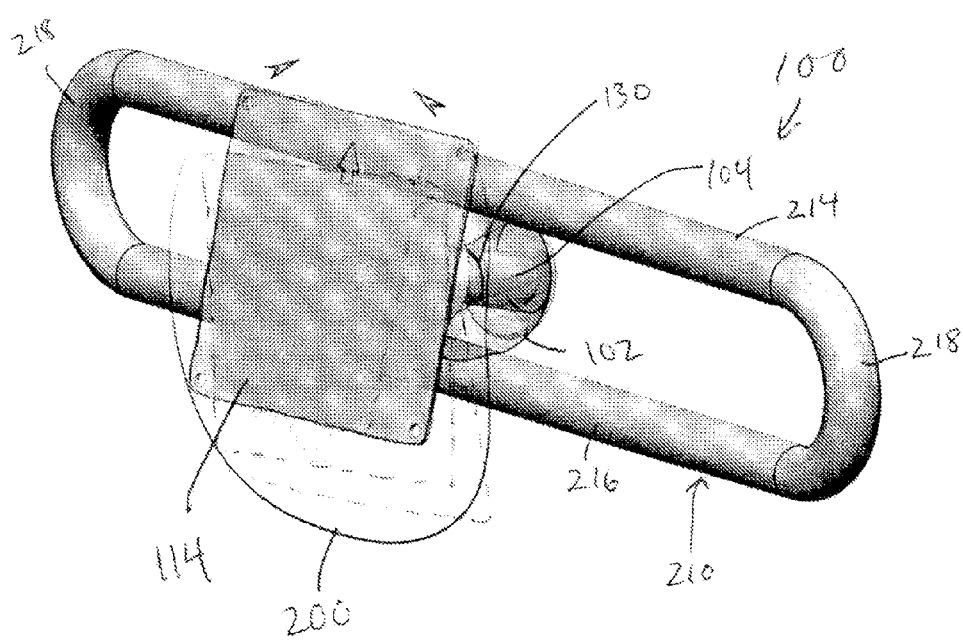
FIG. 6 is a perspective view of the assembled pivoting support system of FIG. 1 according to an embodiment.
Figure 11A:
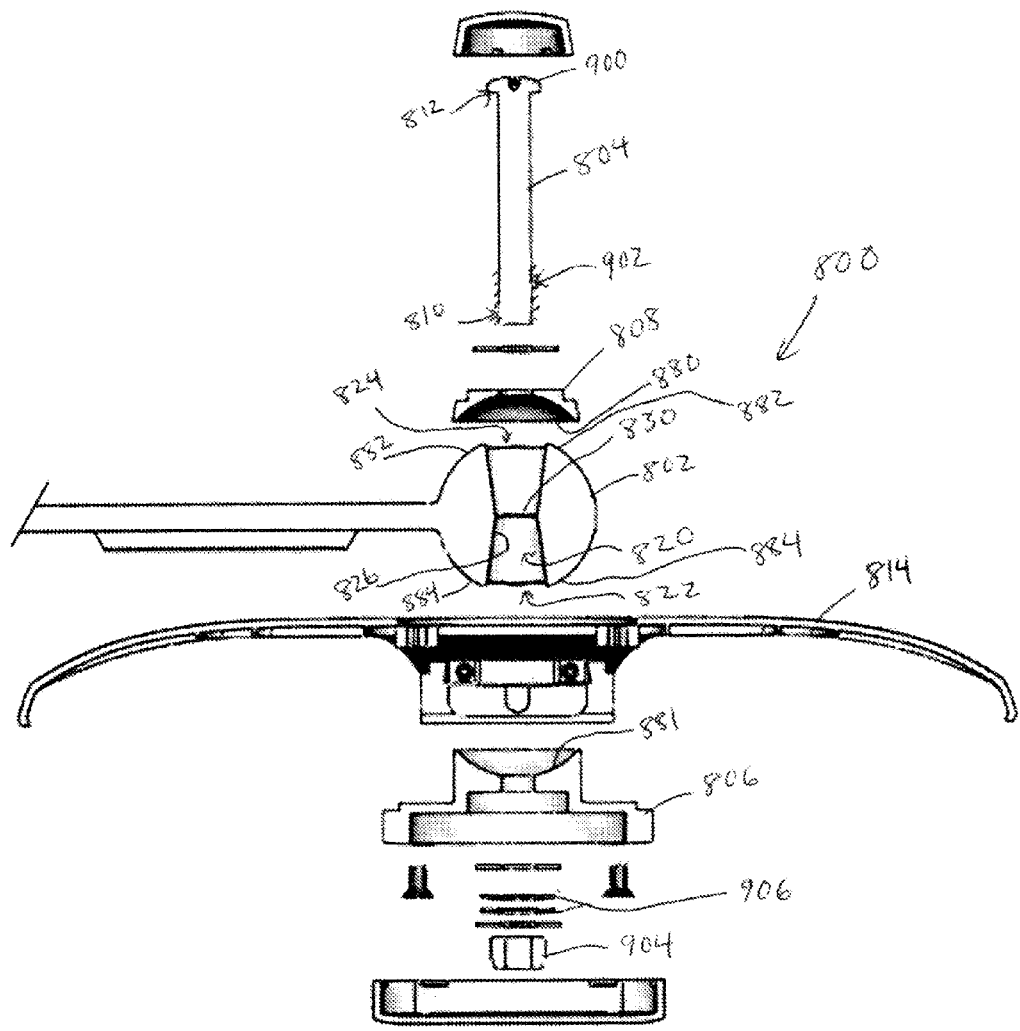
FIG. 11A is an exploded assembly view of the cross-sectional view of FIG. 10 according to an embodiment.
Figure 11B:
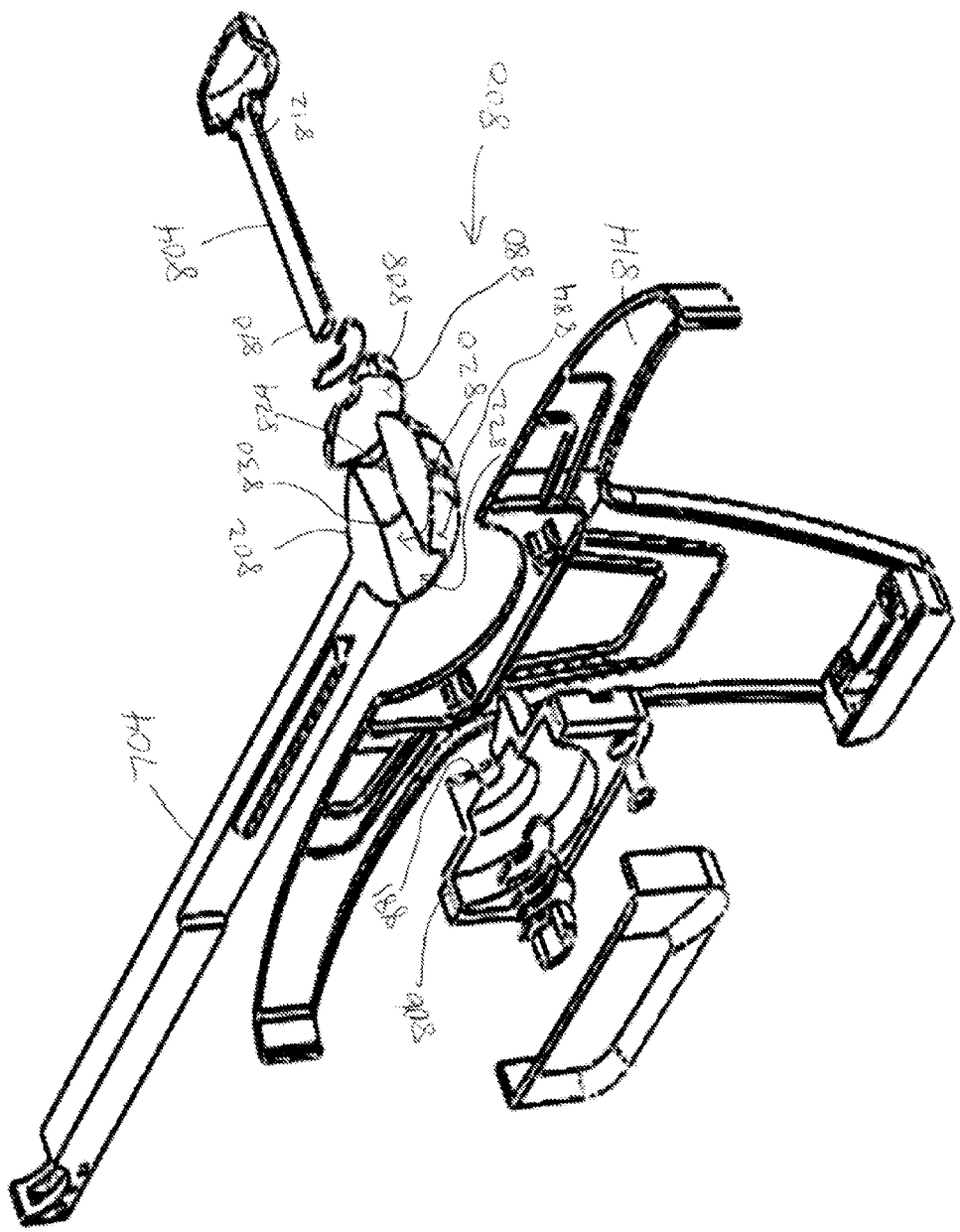
FIG. 11B is a perspective view of the exploded cross-sectional assembly view of FIG. 11A according to an embodiment.
Figure 11C:
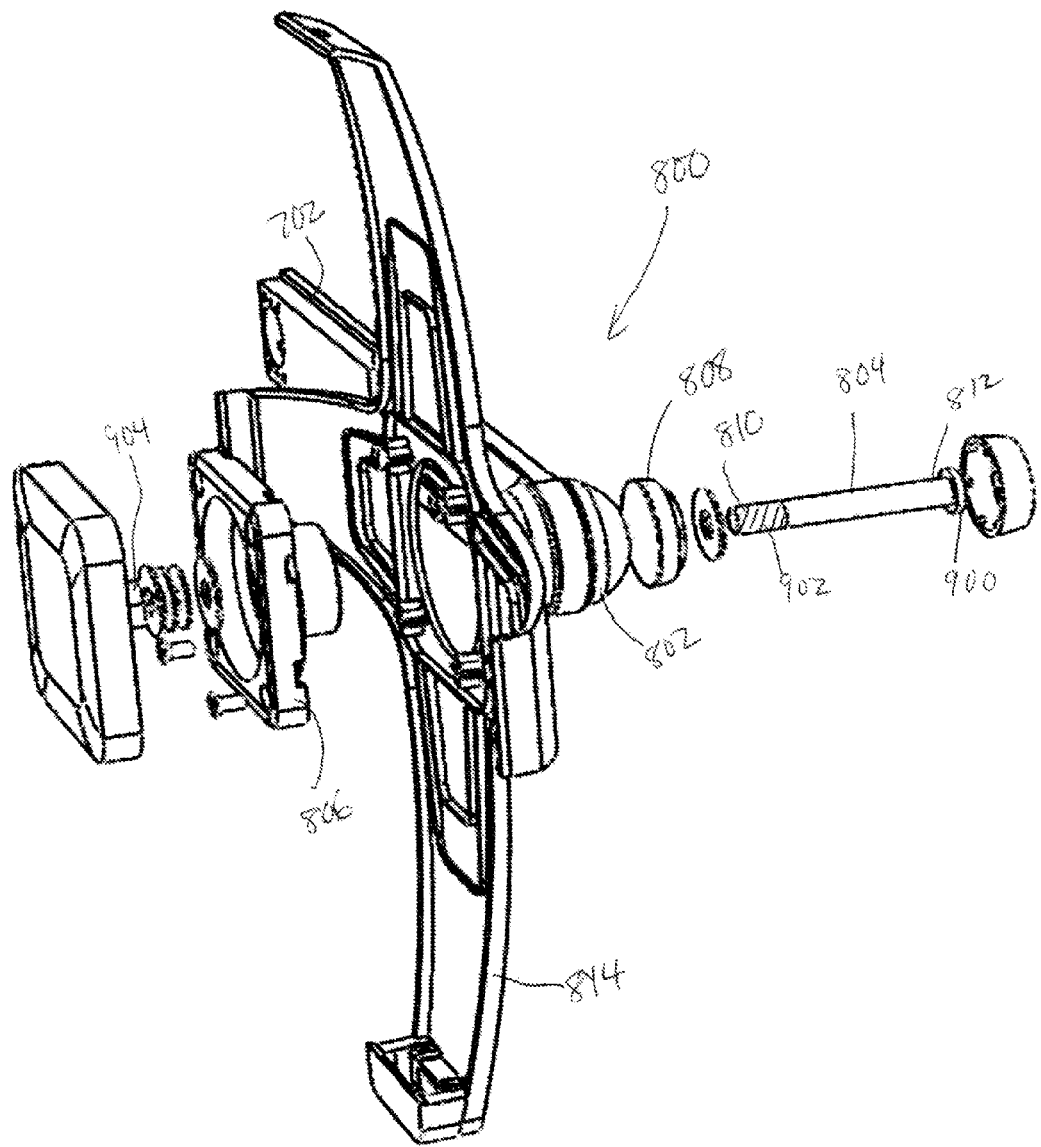
FIG. 11C is a full perspective view of the exploded assembly shown in cross-section in FIG. 11B according to an embodiment.

FIGS. 3, 5, and 6 illustrate additional degrees of freedom and movement provided by the pivoting support system 100 that will now be described according to some embodiments. One or more of these degrees of freedom can optionally be provided in some embodiments, though they are not necessarily required.

Turning to FIG. 5, a perspective view of the assembled pivoting support system 100 of FIG. 1 is shown according to an embodiment. As described above with respect to FIGS. 1 and 4, the extension member 104 has a length that extends between its first and second ends 110, 112 (not shown in FIG. 5). According to some embodiments, the first and the second clamp members 106, 108 rotatably engage the extension member 104 with the support member 102 such that the extension member 104 and the mounting member 114 can rotate through a range of rotation 190 relative to the support member 102 about an axis 192 extending along the length of the extension member 104. According to some embodiments, the rotatable engagement is provided by rotation of the extension member 104 relative to the clamp members 106, 108, such that the extension member 104 rotates within the tubular members 170 of the clamp members.

FIG. 6 is another perspective view of the assembled pivoting support system 100 of FIG. 1 that depicts a range of revolution 200 provided by the pivoting support system according to some embodiments. As shown in FIGS. 1-2B, in some cases the first and second openings 122, 124 in the support member 102 can be defined by corresponding perimeters 202, 204. In some cases the extension member 104 can be effectively moved between adjacent pivot ranges such that it revolves along at least one of the perimeters of the openings. For example, in FIG. 6 the extension member 104 is shown as revolving along the perimeter 202 of the support member's first opening 122 to define the range of revolution 200. In some cases the extension member 104 may also revolve along the perimeter of the second opening and/or the inner boundary surfaces of the cavity 120 as it also revolves about the first opening 122.

As shown in FIGS. 1, 3, and 4-6, in some embodiments the pivoting support system 100 can also include a sliding apparatus 210 that provides the support member 102, the extension member 104, the mounting member 114, and any attached object (e.g., an electronic display) with a range of translation 212. As depicted, in this embodiment the range of translation 212 is generally parallel with the horizontally-oriented pivot axis 146 and coplanar with the pivot 130 provided by the support member 102, though other orientations are also possible. The sliding apparatus 210 allows the support member 102 to be positioned in a number of locations (shown in dashed lines in FIG. 3) along the range of translation in addition to being pivoted as described above. Thus the combination of the sliding apparatus 210 and the support/extension member pivoting arrangement may in some cases optionally be referred to as a positioning system (e.g., an electronic display positioning system) that incorporates a pivot mechanism and/or pivoting support system including the support, clamp, and extension members described above.

According to some embodiments, a sliding apparatus can be provided by any suitable sliding mechanism known in the art. As shown in FIGS. 1-6, in the depicted embodiment, the sliding apparatus 210 includes a top rail 214 and a bottom rail 216 that are connected together by end portions 218. The support member 102 defines a first surface feature 220 corresponding to the top rail 214, which in this case is a groove or indentation in the exterior surface of the support member 102. The support member 102 defines another second surface feature 222 corresponding to the bottom rail 216, which in this case is also a groove or indentation in the exterior surface of the support member 102. Accordingly, the surface features 220, 222 allow the support member 102 to slidingly engage with the top and the bottom rails of the sliding apparatus 210 through the range of translation 212. The combination of the sliding apparatus 210 with the pivoting system thus allows further positioning of an attached object such as an electronic display.

Figure 13:
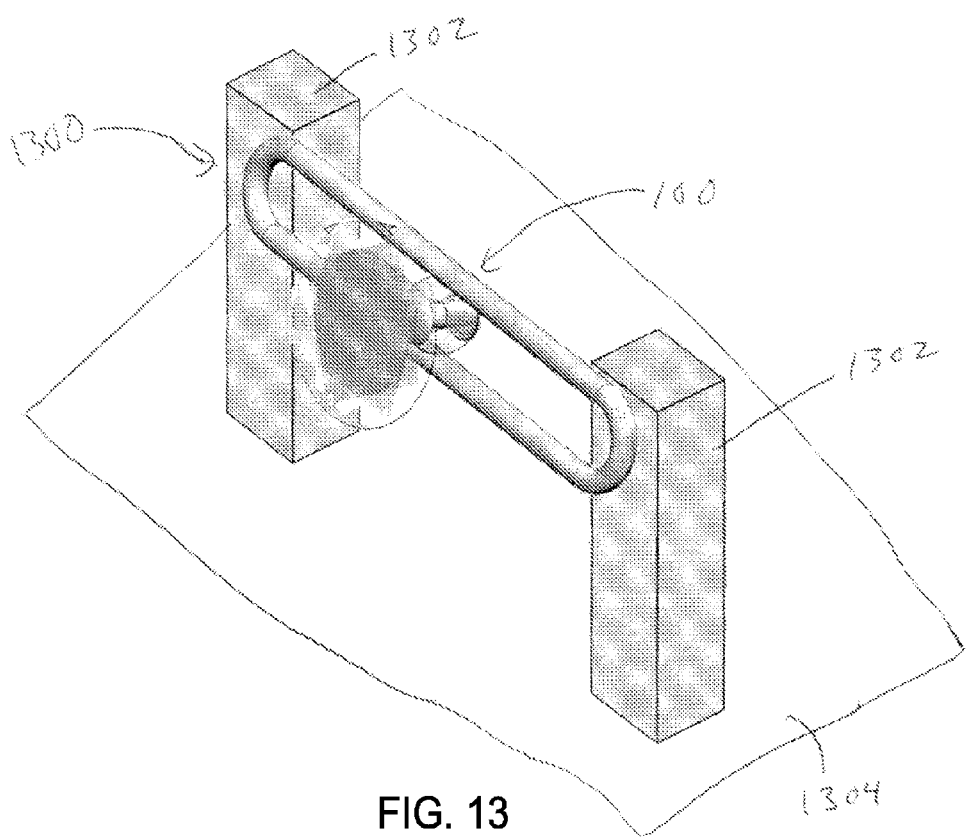
FIG. 13 is a perspective view of display positioning apparatus according to an embodiment.

In some cases a positioning system or apparatus, such as a display positioning system or a display positioning apparatus may include other support structure that supports the support member 102 and/or the sliding apparatus 210 with respect to a support surface. For example, in the case of an electronic display, the pivoting support system 100 can be optionally combined with the sliding apparatus 210 and one or more other support members or structure that are configured to rest upon a support surface such as a desk, table, floor, etc., and/or be fixed to a support surface such as a desk, table, floor, wall, and/or other surface. FIG. 13 provides a simple representation of a display positioning apparatus 1300 that includes the pivoting support system 100 shown in FIGS. 1-6 attached to and supported by support structure 1302 that can position an attached display above a support surface 1304. Of course a wide variety of systems and devices are available for supporting and positioning electronic displays and it is contemplated that embodiments may optionally provide a pivoting support system such as system 100 as part of any known device/system. As just a few examples, the pivoting support system 100 could optionally be adapted for mounting to a desk stand, a floor stand, a cart, an articulating arm, a wall mount, or any other type of display positioning device.

Turning now to FIGS. 7-12B, several views are shown of a display positioning system 700 according to an embodiment of the invention. As will be appreciated, the display positioning system 700 includes some features, components, and/or aspects in common with the pivoting support system 100 shown in FIGS. 1-6 and described above, and such features, components, and/or aspects may thus be described in less detail hereinafter. It should be appreciated, though, that unless otherwise stated, the teachings provided above with respect to the embodiment in FIGS. 1-6 can also be applied to like aspects of the embodiment now described.

FIGS. 7 and 8 provide rear and front perspective views, respectively, of the display positioning system 700. As is shown, the positioning system 700 generally includes a fixed arm 702, an extension arm 704, and a pivoting support system or pivot mechanism 800 configured to support an electronic display 710, which in this case is illustrated as a tablet computer. According to some embodiments, the fixed arm 702 and the extension arm 704 are slidingly engaged so as to provide a sliding apparatus 706 that provides translation of the pivot mechanism 800 through a range of translation. In the depicted example, a support member 802 of the pivot mechanism 800 is coupled proximate one end of the extension arm 704 opposite from the fixed arm 702, thus allowing the support member 802 to translate as the extension arm 704 slides from side to side relative to the fixed arm 702. As will be described further herein, the support member 802 is coupled to a mounting member 714 via an extension member that is received at least partially within a cavity defined by the support member 802. In the depicted embodiment, the mounting member 714 includes a display mounting apparatus including edge clips 715 and is configured to hold and support a tablet computer 710 or other electronic display.

As shown in FIGS. 7 and 8, in some cases the fixed arm 702 can include a mounting interface 720 that allows the fixed arm to be coupled to additional support structure for supporting and positioning the arms 702, 704, the pivot mechanism 800, and the display 710 relative to a support surface. In the example shown in FIGS. 7 and 8, the mounting interface 720 is configured as a VESA interface, although any type of interface or other attachment feature or mechanism can be employed.

Figure 14:
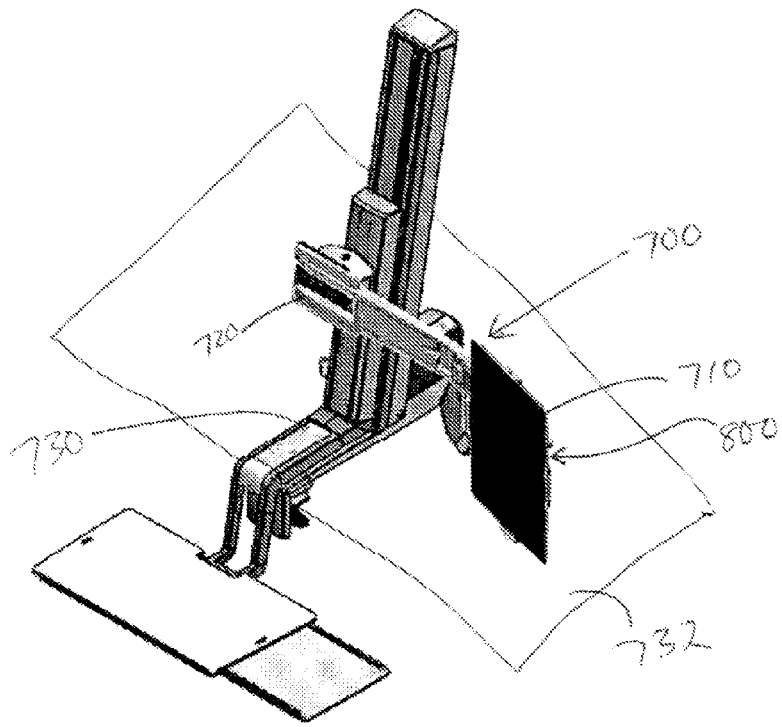
FIG. 14 is a perspective view of display positioning apparatus according to an embodiment.
Figure 15A:
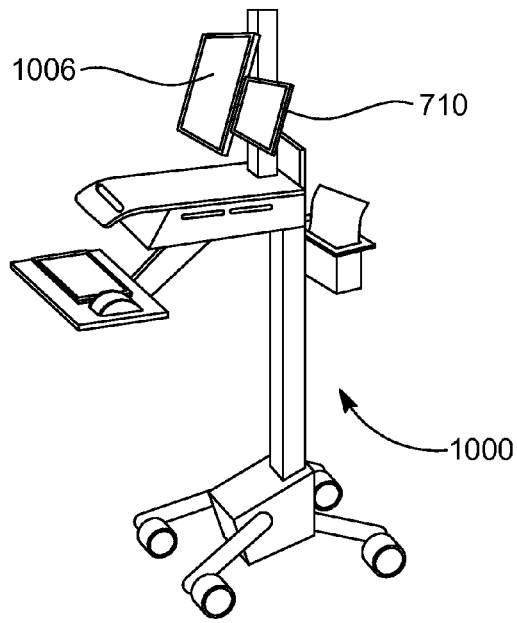
FIGS. 15A-15C are perspective views of a display positioning apparatus including a pivot system mounted to a cart, a wall mount, and a desk mount, respectively, according to some embodiments.
Figure 15B:
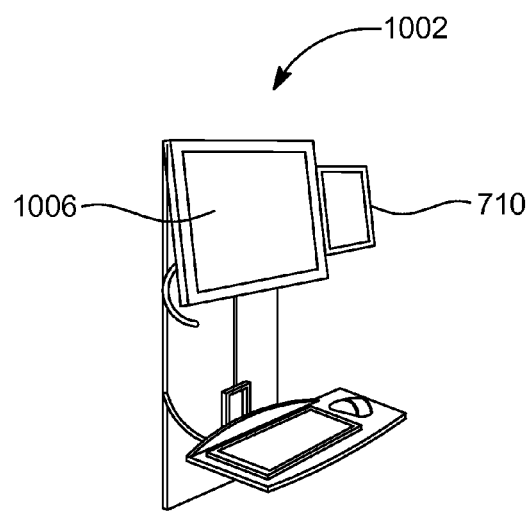
Figure 15C:
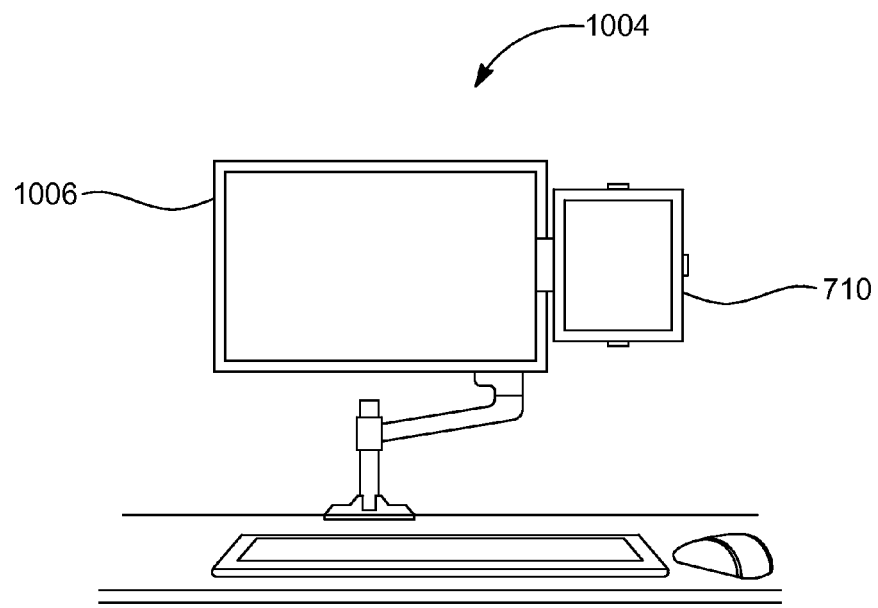

Turning to FIG. 14, in some cases the display positioning system 700 can be mounted to a display positioning apparatus 730 using the mounting interface 720. Thus, the display positioning apparatus 730 provides additional support structure that in combination with the system 700 can position the electronic display 710 relative to a support surface 732 (e.g., in this case a desk, table, counter, etc.). Although not shown, in some cases the mounting interface 720 may be further configured to also receive or be mounted to an additional electronic display, such as a television or monitor that is larger than the display 710 mounted to the pivot mechanism 800. Of course a wide variety of systems and devices are available for supporting and positioning electronic displays and it is contemplated that embodiments may optionally provide the display positioning system 800 as part of any known device/system. As just a few examples, the system 800 could mounted to a desk stand, a floor stand, a cart, an articulating arm, a wall mount, or any other type of display positioning device. FIGS. 15A-15C illustrate examples of the system 800 mounted to a cart 1000, a wall mount 1002, and a desk mount 1004, respectively. As shown, each embodiment provides an example in which an additional electronic display 1006 can be mounted to the mounting interface 720 (not shown), thus positioning the display 1006 next to the display 710 supported by the pivot mechanism 800 (not shown).

Turning to FIG. 9, a top plan view of the display pivoting system 700 of FIG. 7 is shown according to an embodiment. The top view of FIG. 7 depicts the sliding apparatus 706 including the fixed arm 702 and the extension arm 704, and the pivot mechanism 800, which is coupled to the sliding apparatus 706. According to some embodiments, the support member 802 of the pivot mechanism 800 can be attached to or integrally formed as part of the extension arm 704. As just one example, in some cases the support member 802 may be integrally cast or molded with the extension arm from a metal, plastic, nylon, or any other suitable materials.

Figures 12A, 12B:
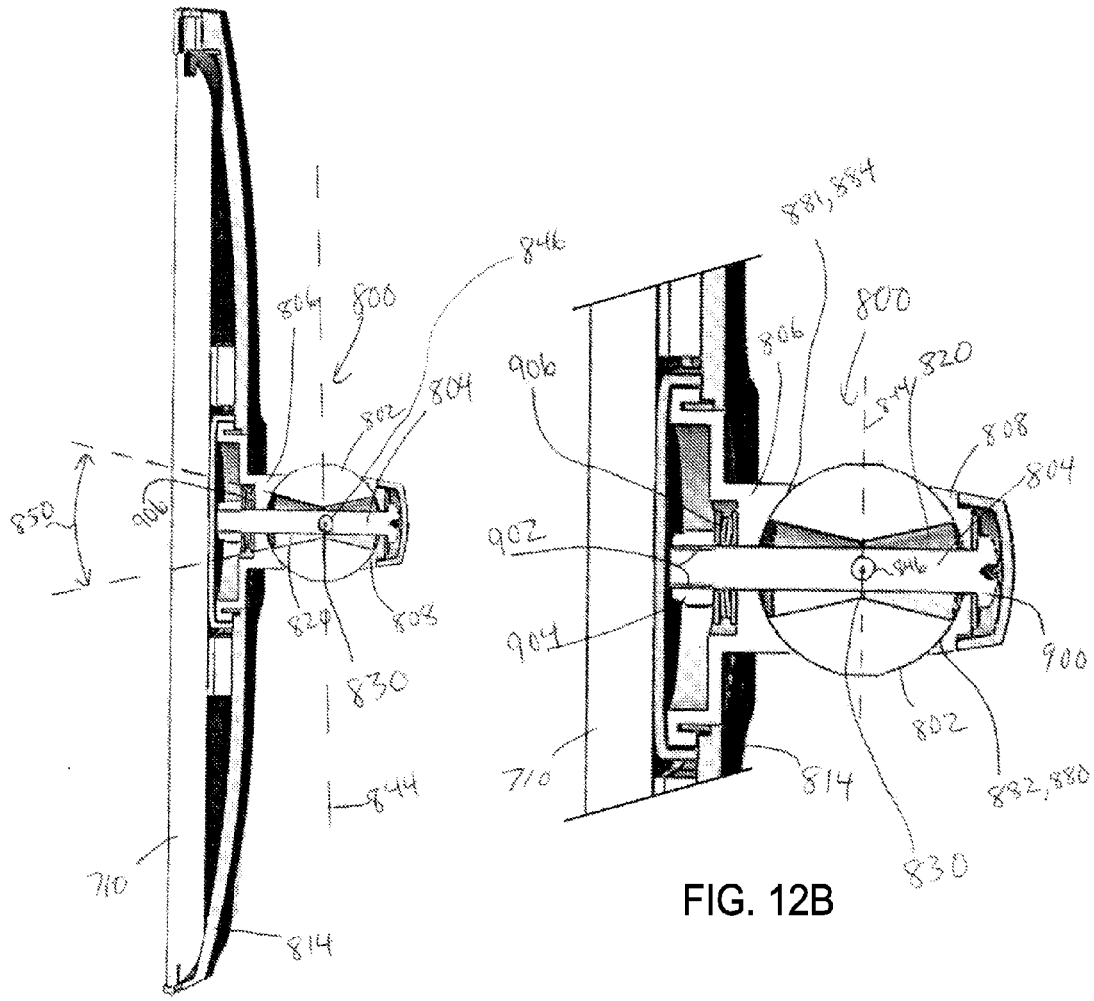
FIG. 12A is a second cross-section of a portion of the display pivoting system of FIG. 7 according to an embodiment.
FIG. 12B is an enlarged view of FIG. 12A according to an embodiment.

FIGS. 10-12B provide various perspective and cross-sectional views of the pivot mechanism 800, and certain features and/or components of the pivot mechanism 800 will now be described with respect to these figures. Briefly, FIG. 10 is a first, horizontally taken cross-section of a portion of the display pivoting system 700 without the fixed arm 702 and without showing the display 710. FIG. 11A is an exploded assembly view of FIG. 10, and FIG. 11B is a perspective view of the cross-section shown in FIG. 11A. FIG. 11C is similar to the view of FIG. 11B, but shows a full perspective view of the pivot mechanism 800. FIGS. 12A and 12B illustrate side cross-sectional views of the system 700 holding the display 710, with FIG. 12B providing an enlarged view of a portion of FIG. 12A.

As described above with respect to the system 100 shown in FIGS. 1-6, the system 700 shown in FIGS. 7-12B, and more particularly, the pivot mechanism 800, includes a generally spherically shaped support member 802 that defines a cavity 820 having an inner surface 826 located within the cavity 820. The cavity 820 extends between a first opening 822 and a second opening 824 in the support member 802 and can be provided in a variety of configurations, shapes, and sizes as described elsewhere herein. The inner surface 286 provides a pivot 830 that defines multiple pivot axes extending through the pivot 830 and the cavity 820 defines a corresponding pivot range (e.g., a tilt range, a pan range, etc.) about each of the pivot axes. The pivot mechanism 800 also includes an extension member 804 having first and second ends 810, 812 and a length extending there between. As with the embodiments described elsewhere, in some cases the extension member 804 is at least partially received within the cavity 820 and is located near the pivot 830 so that the extension member 804 is generally pivotable about each of the pivot axes through the corresponding pivot ranges. The pivot mechanism 800 also includes first and second clamp members 806, 808 that engage the extension member 804 and the support member 802 to retain the extension member at least partially within the cavity 820. For example, according to some embodiments, the clamp members 806, 808 include sliding surfaces 880, 881 that slidingly engage corresponding outer surfaces 882, 884 of the support member 802 as described elsewhere. In addition, the mounting member 814 is coupled proximate the first end 810 of the extension member 804 for attaching and/or supporting the electronic display 710.

As will be appreciated from FIGS. 7-12B, according to some embodiments the engagement between the extension member 804 and the first and second clamp members 806, 808 operates to force the clamp members against the support member 802 and retain the extension member 804 within the cavity 820 in a manner different from the embodiment shown in FIGS. 1-6. For example, in some embodiments engagement between the extension member 804 and the clamp members 806, 808 compresses the clamp members 806, 808 against the first and second outer surfaces 882, 884 of the support member 802. It should be appreciated that a compressive engagement between the extension member 804 and the clamp members can be provided in a variety of manners; thus embodiments are not limited to any particular configuration. In the embodiment depicted in FIGS. 7-12B, the extension member 804 is formed as a bolt with a retaining head 900 proximate the second end 812 and threads 902 formed about the first end 810 that engage a nut 904. The nut 904 can be tightened with respect to the threads 902 to compress the clamp members 806, 808 together against the support member 802. In some cases a spring component 906 (e.g., beveled washers, spring washers, etc.) can be positioned on the bolt between the nut 904 and the first clamp member 806, and/or between the retaining head 900 and the second clamp member 808. The spring factor of the component 906 can provide a releasable tension between the clamp members and the support member 802 that can be temporarily overcome with sufficient force when adjustment of the pivot mechanism 800 is desired.

As described above, according to some embodiments the pivot 830 within the support member 802 may define a vertically-oriented pivot axis 844 and a horizontally-oriented pivot axis 846 (e.g., vertical or horizontal with respect to the views of the figures). According to some embodiments, pivoting of the extension member 804 about the vertically-oriented pivot axis 844 may also be referred to as panning, and the pivot axis 844 may be referred to as a pan axis. In some cases pivoting of the extension member 804 about the horizontally-oriented pivot axis 846 may also be referred to as tilting, and the pivot axis 846 may be referred to as a tilt axis.

As described elsewhere herein, the cavity 820 can define a pivot range corresponding to each of the pivot axes (e.g., vertical axis 844 and/or horizontal axis 846). As shown in FIG. 12A, the cavity 820 defines a first pivot range 850 corresponding to the horizontally-oriented pivot axis 846. Thus, the extension member 804, the mounting member 814, and an electronic display attached to the mounting member 814 can be tilted up and down about the pivot axis 846 through the first pivot range 850. As shown in FIGS. 9 and 10, the cavity 820 defines a second pivot range 852 about the vertically-oriented pivot axis 844. Accordingly, the extension member 804, the mounting member 814, and a supported object can be panned side to side about the pivot axis 844 through the second pivot range 852.

As discussed elsewhere, the extent of the pivot ranges provided by different embodiments can be varied by providing the support member cavity 820 with different shapes and sizes. In some cases a pivot range may extend up to about ±10 degrees about the pivot axis, up to about ±45 degrees about the pivot axis, or up to about ±60 degrees or more about the pivot axis depending upon the desired amount of pivoting.

According to some embodiments, a pivot range is at least equal to or in some cases at least greater than about ±5 degrees. Further, as described above, in some cases not all pivot ranges may be of equal size. For example, in some cases one or more pivot ranges may be larger than one or more other pivot ranges. According to some embodiments, for example, a tilt range may be greater than a pan range. According to one embodiment, in some cases a tilt range can be about ±10 degrees, while a pan range may be about ±7 degrees. As described above, variation in the pivot ranges can be provided by changing the size and/or shape of the support member cavity 820.

According to some embodiments, methods for pivoting an electronic display can also be provided. One example of a contemplated method includes mounting an electronic display (or other object) to a pivoting support system such as one of those described herein. The method then includes tilting and panning the display using the pivoting support system.

In some cases tilting the electronic display can include tilting a mounting member and an extension member through a tilt range. As described above, the extension member may be at least partially located within a cavity of a support member of the pivoting support system. The cavity can define the tilt range about a generally horizontal axis extending through the support member. The axis corresponds to a pivot provided by an inner surface of the cavity. According to some embodiments, tilting an electronic display can also include sliding first and second surfaces of first and second clamp members, respectively, across corresponding first and second outer surfaces of the support member. Sliding the surfaces overcomes frictional resistance to tilting generated between the first and the second clamp members and the support member that may otherwise restrain relative movement between the extension member and the support member.

In some cases panning the electronic display relative to the pivoting support system includes rotating the mounting member and the extension member through a pan range. The pan range can be defined by the support member cavity about a generally vertical axis extending through the support member and corresponding to the pivot provided by the inner surface of the cavity. Panning the electronic display may also include sliding the first and the second surfaces of the first and the second clamp members, respectively, across the corresponding first and second outer surfaces of the support member. Such panning thus overcomes frictional resistance generated between the first and the second clamp members and the support member that may otherwise restrain relative movement between the extension member and the support member.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A pivoting support system, comprising:
   a support member defining a cavity and comprising an inner surface,
      the cavity extending through the support member between a first opening in the support member and a second opening in the support member,
      the inner surface located within the cavity and providing a pivot defining a first pivot axis extending through the support member, the cavity defining a first pivot range about the first pivot axis, wherein the cavity has a first frustoconical portion and a second frustoconical portion, and wherein the inner surface of the support member provides the pivot at a transition between the first frustoconical portion and the second frustoconical portion;

an extension member comprising first and second ends,
the extension member located at least partially within the cavity of the support member near the pivot so that the extension member is generally pivotable about the first pivot axis through the first pivot range defined by the cavity,
the first end of the extension member protruding from the first opening in the support member;

a first clamp member and a second clamp member, the first and the second clamp members engaging the extension member and the support member to retain the extension member at least partially within the cavity of the support member; and a mounting member coupled proximate the first end of the extension member, the mounting member configured to support an object as the extension member pivots through the first pivot range relative to the support member.

2. The pivoting support system of claim 1, wherein the pivot defines a second pivot axis extending through the support member generally perpendicular to the first pivot axis, the cavity defines a second pivot range about the second pivot axis, and wherein the extension member is generally pivotable about the second pivot axis through the second pivot range defined by the cavity.

3. The pivoting support system of claim 2, wherein the first pivot range is about ±60 degrees or less and the second pivot range is about ±60 degrees or less.

4. The pivoting support system of claim 1, wherein the pivot defines an infinite number of pivot axes extending through the support member, the cavity defines a corresponding pivot range about each of the infinite number of pivot axes, and wherein the extension member is generally pivotable about each of the infinite number of pivot axes through the corresponding pivot range defined by the cavity.

5. The pivoting support system of claim 1, wherein the first opening in the support member is defined by a first perimeter of the support member and wherein the extension member is movable about the pivot so as to revolve along the first perimeter about the first opening.

6. The pivoting support system of claim 1, wherein the extension member comprises a length extending between the first and the second ends of the extension member, and wherein the first and the second clamp members rotatably engage the extension member with the support member such that the extension member and the mounting member can rotate relative to the support member about an axis extending along the length of the extension member.

7. The pivoting support system of claim 1, wherein the extension member comprises a length extending between the first and the second ends of the extension member, and wherein the first and the second clamp members allow adjustment of an axial location of the extension member relative to the support member along an axis extending along the length of the extension member.

8. The pivoting support system of claim 1, wherein
the support member comprises a first outer surface proximate the first opening and a second outer surface proximate the second opening,
the first clamp member comprises a first sliding surface configured to slidingly engage the first outer surface as the extension member pivots through the first pivot range, the sliding engagement providing a first frictional resistance to relative movement between the first sliding surface and the first outer surface, and
the second clamp member comprises a second sliding surface configured to slidingly engage the second outer surface as the extension member pivots through the first pivot range, the sliding engagement providing a second frictional resistance to relative movement between the second sliding surface and the second outer surface.

9. The pivoting support system of claim 1, wherein the first and the second clamp members are directly connected through the cavity with at least one of the first clamp member and the second clamp member extending within the cavity, and wherein the first and the second clamp members each comprise a through hole that receives the extension member in a friction fit.

10. The pivoting support system of claim 1, wherein the mounting member is attached to the extension member at the first end of the extension member.

11. A display positioning system, comprising:
a support structure configured to rest upon a support surface and/or be fixed to a support surface;
a sliding apparatus coupled to the support structure;
a support member coupled to the sliding apparatus, the support member defining a cavity and comprising an inner surface,
the sliding apparatus providing the support member with a range of translation,
the cavity extending through the support member between a first opening in the support member and a second opening in the support member,
the inner surface located within the cavity and providing a pivot defining a plurality of pivot axes extending through the support member,
the cavity defining a corresponding pivot range about each of the plurality of pivot axes;
an extension member comprising first and second ends and having a length extending between the first and the second ends,
the extension member located near the pivot so that the extension member is generally pivotable about each of the plurality of pivot axes through the corresponding pivot range defined by the cavity,
a first clamp member and a second clamp member, the first and the second clamp members engaging the extension member and the support member to retain the extension member at least partially within the cavity of the support member; and
a mounting member coupled proximate the first end of the extension member, the mounting member configured to support an electronic display as the extension member pivots relative to the support member through each of the corresponding pivot ranges.

12. The display positioning system of claim 11, wherein the sliding apparatus comprises a top rail and a bottom rail, and wherein the support member defines a first surface feature corresponding to the top rail and a second surface feature corresponding to the bottom rail such that the support member is slidingly engaged with the top and the bottom rails through the range of translation.

13. The display positioning system of claim 11, wherein the sliding apparatus comprises a first arm coupled to the support structure and a second arm coupled the support member, the first and the second arms slidingly engaged to provide movement of the support member through the range of translation.

14. The display positioning system of claim 11, wherein
the support member comprises a first outer surface proximate the first opening and a second outer surface proximate the second opening,
the first clamp member comprises a first sliding surface configured to slidingly engage the first outer surface as the extension member pivots through each of the corresponding pivot ranges, the sliding engagement providing a first frictional resistance to relative movement between the first sliding surface and the first outer surface,
the second clamp member comprises a second sliding surface configured to slidingly engage the second outer surface as the extension member pivots through each of the corresponding pivot ranges, the sliding engagement providing a second frictional resistance to relative movement between the second sliding surface and the second outer surface, and
wherein engagement between the extension member and the first and the second clamp members compresses the first and the second clamp members against the first and the second outer surfaces, respectively.

15. The display positioning system of claim 11, wherein the plurality of pivot axes comprises a generally horizontal axis extending through the support member and a generally vertical axis extending through the support member, and wherein the corresponding pivot ranges comprises a tilt range defined by the cavity about the generally horizontal axis and a pan range defined by the cavity about the generally vertical axis.

16. The display positioning system of claim 15, wherein the tilt range is greater than about ±5 degrees and the pan range is greater than about ±5 degrees.

17. The display positioning system of claim 15, wherein the tilt range has a different size than the pan range.

18. The display positioning system of claim 11, wherein the first and the second clamp members rotatably engage the extension member with the support member such that the extension member and the mounting member can rotate relative to the support member about an axis extending along the length of the extension member.

19. A pivoting support system, comprising:
a support member defining a cavity and comprising an inner surface,
the cavity extending through the support member between a first opening in the support member and a second opening in the support member,
a first outer surface proximate the first opening and a second outer surface proximate the second opening,
the inner surface located within the cavity and providing a pivot defining a first pivot axis extending through the support member,
the cavity defining a first pivot range about the first pivot axis;
an extension member comprising first and second ends,
the extension member located at least partially within the cavity of the support member near the pivot so that the extension member is generally pivotable about the first pivot axis through the first pivot range defined by the cavity,
the first end of the extension member protruding from the first opening in the support member,
a first clamp member and a second clamp member, the first and the second clamp members engaging the extension member and the support member to retain the extension member at least partially within the cavity of the support member,
the first clamp member comprising a first sliding surface configured to slidingly engage the first outer surface as the extension member pivots through the first pivot range, the sliding engagement providing a first frictional resistance to relative movement between the first sliding surface and the first outer surface,
the second clamp member comprising a second sliding surface configured to slidingly engage the second outer surface as the extension member pivots through the first pivot range, the sliding engagement providing a second frictional resistance to relative movement between the second sliding surface and the second outer surface; and
a mounting member coupled proximate the first end of the extension member, the mounting member configured to support an object as the extension member pivots through the first pivot range relative to the support member.

* * * * *